(12) United States Patent
Yu et al.

(10) Patent No.: US 7,596,644 B2
(45) Date of Patent: Sep. 29, 2009

(54) TRANSMIT RATE PACING SYSTEM AND METHOD

(75) Inventors: Ching Yu, Santa Clara, CA (US); David Riddoch, Cambridge (GB); Steve Pope, Cambridge (GB); John Mingyung Chiang, San Jose, CA (US); Alok Singh, Fremont, CA (US); Derek Roberts, Cambridge (GB)

(73) Assignee: Solarflare Communications, Inc., Irvine, CA (US)

( * ) Notice: Subject to any disclaimer, the term of this patent is extended or adjusted under 35 U.S.C. 154(b) by 404 days.

(21) Appl. No.: 11/329,444

(22) Filed: Jan. 11, 2006

(65) Prior Publication Data
US 2007/0174511 A1 Jul. 26, 2007

(51) Int. Cl.
*G06F 3/00* (2006.01)
(52) U.S. Cl. ............................. 710/60; 710/22; 710/29; 710/36; 710/39; 710/58; 709/250; 370/230; 370/235
(58) Field of Classification Search .................. 710/22, 710/29, 36, 39, 58, 60; 709/250; 370/230, 370/235
See application file for complete search history.

(56) References Cited

U.S. PATENT DOCUMENTS

| | | | |
|---|---|---|---|
| 5,890,199 A | | 3/1999 | Downs |
| 6,011,798 A | * | 1/2000 | McAlpine ............... 370/395.42 |
| 6,334,162 B1 | | 12/2001 | Garrett et al. |
| 6,397,316 B2 | | 5/2002 | Fesas, Jr. |
| 6,650,650 B1 | * | 11/2003 | Schneider et al. ........... 370/412 |
| 6,661,774 B1 | * | 12/2003 | Lauffenburger et al. .. 370/230.1 |
| 7,448,049 B1 | * | 11/2008 | Xing ........................... 719/318 |
| 7,451,456 B2 | * | 11/2008 | Andjelic ..................... 719/321 |
| 2003/0189943 A1 | | 10/2003 | Gorti et al. |
| 2004/0128535 A1 | | 7/2004 | Cheng |
| 2005/0099979 A1 | | 5/2005 | Chandra |

FOREIGN PATENT DOCUMENTS

| | | |
|---|---|---|
| DE | 10318730 | 11/2004 |
| GB | 2276254 | 9/1994 |

(Continued)

OTHER PUBLICATIONS

PCI Local Bus, "PCI-X Addendum to the PCI Local Bus Specification" Revision 1.0a, pp. 1-240, Jul. 24, 2000.

(Continued)

*Primary Examiner*—Eron J Sorrell
(74) *Attorney, Agent, or Firm*—Warren S. Wolfeld; Haynes Beffel & Wolfeld LLP

(57) ABSTRACT

System and method of a pace engine for governing the different transmission rates tailored for different connections by rate pacing a plurality of queues are described. Roughly described, the pace engine includes a binning controller for receiving queues from a transmit DMA queue manager and determines the earliest allowed time for a particular queue that is stored and paced in a Work Bin, a Fast Bin, or a Slow Bin. A pace table stores information about the minimum inter-packet-gap for each connection that is coupled to the transmit DMA queue manager. A timer is coupled to the binning controller with a multi-bit continuous counter that increments at a predetermined time unit and wraps around after a predetermined amount of time.

23 Claims, 7 Drawing Sheets

FOREIGN PATENT DOCUMENTS

| | | |
|---|---|---|
| WO | 0131854 | 5/2001 |
| WO | 2004051482 | 6/2004 |

OTHER PUBLICATIONS

Riddoch, David et al.; "Distributed Computing With the CLAM Network"; Laboratory for Communications Engineering, Cambridge, England; SIGCOMM 2002, 13 pages.

Mansley, Kieran; "Engineering a User-Level TCP for the CLAN Network"; Laboratory for Communication Engineering, University of Cambridge, Cambridge, England; AGM SIGCOMM Aug. 2003 Workshops, 228-236.

Pratt, Ian et al.; "Arsenic: A User-Accessible Gigabit Ethernet Interface"; Computer Laboratory, University of Cambridge, England; UK Engineering and Physical Sciences Research Councel (EPSRC), Apr. 2001, 11 pages.

International Search Report in PCT/GB2006/003502 mailed Mar. 4, 2007.

* cited by examiner

TRANSMIT RATE PACING SYSTEM AND METHOD

BACKGROUND INFORMATION

1. Field of the Invention

The present invention relates generally to network communications, and more particularly, to efficient transmission of bursts of packets for optimizing a network traffic utilization.

2. Description of Related Art

A typical computer system includes a processor subsystem (including one or more processors), a memory subsystem (including main memory, cache memory, etc.; also sometimes referred to herein as "host memory"), and a variety of "peripheral devices"connected to the processor subsystem via a peripheral bus. Peripheral devices may include, for example, keyboard, mouse and display adapters, disk drives and CD-ROM drives, network interface devices, and so on. The processor subsystem communicates with the peripheral devices by reading and writing commands and information to specific addresses that have been preassigned to the devices. The addresses may be preassigned regions of a main memory address space, an I/O address space, or another kind of configuration space. Communication with peripheral devices can also take place via direct memory access (DMA), in which the peripheral devices (or another agent on the peripheral bus) transfers data directly between the memory subsystem and one of the preassigned regions of address space assigned to the peripheral devices.

When large amounts of data are to be transferred across between the memory subsystem and a peripheral device, it is usually highly inefficient to accomplish this by having the processor subsystem retrieve the data from memory and write it to the peripheral device, or vice-versa. This method occupies an enormous amount of the processor's time and resources, which could otherwise be used to advance other processing jobs. It is typically much more efficient to offload these data transfers to a data transfer DMA engine, which can control the transfers while the processor subsystem works on other jobs. The processing subsystem controls the data transfer DMA engine by issuing DMA commands to it, the commands identifying in one way or another the starting address in either host memory or the peripheral device or both, and the length of the transfer desired. DMA commands are also sometimes referred to herein as DMA descriptors, and the portion of a DMA command that identifies a starting address is sometimes referred to herein as a pointer. As used herein, "identification" of an item of information does not necessarily require the direct specification of that item of information. Information can be "identified" in a field simply by referring to the actual information through one or more layers of indirection, or by identifying one or more items of different information which are together sufficient to determine the actual item of information. For example, a pointer "identifying" a starting address in host memory may specify the entire physical host memory address, or it may specify an address in a larger memory address space which is mapped to a physical address, or it might specify a virtual address which is mapped to a physical address, or it might specify an address in a user address space which is mapped to a physical address in further dependence upon a user ID of some kind, or it may identify in any of these ways an address that is one less or one greater than the actual starting address identified, and so on. In addition, the term "indicate" is used herein to mean the same as "identify".

In various different computer system arrangements, the data transfer DMA engine may be located across a communication channel from the source of the DMA commands. Often this communication channel is the same as the peripheral bus via which the data itself is transferred, but in some systems it could involve a different bus, either instead of or additionally to the peripheral bus. Often it is advantageous to transfer DMA commands to the data transfer DMA engine in bursts rather than individually, especially where the communication channel supports a burst transfer mode. In a burst transfer mode, multiple data units can be transferred based on only a single starting address identification because logic on both sides of the communication channel know and agree on how to increment the address automatically for the second and subsequent data units. If the communication bus is shared by other agents, then bursts can be advantageous even if there is no special burst transfer mode because arbitration delays are reduced.

For the same reasons that it is advantageous to offload data transfers to a data transfer DMA engine, it is often advantageous to also offload DMA command transfers to a command transfer DMA engine. The command transfer DMA engine may be the same as or different from the data transfer DMA engine in different embodiments. In order to use a command transfer DMA engine, the processor subsystem creates a DMA command queue in a memory that is accessible to the processor subsystem without crossing the communication channel. Typically the DMA command queue is created in the memory subsystem. The processor subsystem then programs the command transfer DMA engine to transfer one or more DMA commands, across the communication channel, from the queue to a local memory that is accessible to the data transfer DMA engine without again crossing the communication channel. Typically the programming of the command transfer DMA engine includes, among other things, programming in the host memory address from which the first data transfer DMA command is to be read, the address in the local memory to which the first data transfer DMA command is to be written, and an identification of the length of the transfer. The data transfer DMA engine then reads the DMA commands from the local memory and executes them in a known sequence.

One type of peripheral device that often requires the transfer of large amounts of data between the peripheral device and the memory subsystem is a network interface device. Network interface devices were historically implemented on plug-in cards, and therefore are sometimes referred to as network interface cards (NICs). As used herein, though, a NIC need not be implemented on a card. For instance it could be in the form of integrated circuits (ICs) and connectors fitted directly onto a motherboard, or in the form of macro-cells fabricated on a single integrated circuit chip with other components of the computer system. Since a NIC will typically both transmit and receive data from a network, the processor subsystem may set up two DMA command queues in the memory subsystem, a transmit (Tx) DMA command queue identifying data buffers in memory ready for transmit onto the network, and a receive (Rx) DMA command queue identifying data buffers in memory that are available to receive data incoming from the network. Since transmit and receive buffers are not typically used at even rates, the NIC's local memory may maintain separate transmit and receive queues as well.

The command transfer DMA engine needs to know both the host memory address from which the first data transfer DMA command is to be read, and the address in the local memory to which the first data transfer DMA command is to be written. If there is only a single DMA command queue and a single local store for storing the retrieved data transfer DMA commands, then the peripheral device need only have storage for two address pointers to implement the retrieval of data transfer commands by DMA: the host memory address from which the first data transfer DMA command is to be read (a read pointer), and the address in the local memory to which the first data transfer DMA command is to be written (a write pointer). The storage space required to implement these two pointers is not a stretch in modem technologies. In the NIC situation described above there are two host memory queues and two local stores for storing retrieved data transfer DMA commands, so in this situation storage for four address pointers is needed.

Some NICs implement multiple, e.g. up to about 8 or 16, physical network ports. For these NICs, it may be desirable to implement a separate pair of queues in host memory for each physical port, and a corresponding pair of local stores for each physical port. In this situation storage for up to about 16 or 32 address pointers might be needed. This requirement is still not exorbitant, but still it would be desirable to reduce the size of this address pointer storage to reduce space utilization if possible.

U.S. patent application No. 11/050,476, filed Feb. 3, 2005, entitled "Interrupt Management for Multiple Event Queues" and U.K. Patent Application No. GB0408876A0, filed Apr. 21, 2004, entitled "User-level Stack", both incorporated herein by reference, both describe architectures in which the operating system supports numerous protocol stacks, each with its own set of transmit and receive data structures, and all assisted by functions performed in hardware on the NIC. The number of transmit and receive data queues can number in the thousands, with a corresponding number of local stores for storing retrieved data transfer DMA commands. Many thousands of address pointers are required in such an architecture, occupying significant space on an integrated circuit chip. For example, with 4 k Tx DMA command queues and 4 k Tx DMA command queues, and a corresponding number (8 k) local stores for storing retrieved data transfer DMA commands, storage is required on the NIC for 8 k read pointers and 8 k write pointers. If each local store requires 7 bits to uniquely address each entry (i.e. the store can hold 128 entries), then storage for 56 k bits are required just to hold the write pointers.

Transmission Control Protocol (TCP) was designed to operate over a variety of communication links. Advances in different communication mediums, including high-bandwidth links, wireless, fiber-optics networks, and satellite present a situation where there may be an increasingly large discrepancy between the bandwidth capacities of receiving stations. TCP compounds the mismatches between the transmission rate and the various receiving links by sending bursts (or windows) of packets, which affects the throughput, fairness, queue size, and drop rate in network communications.

In a network topology, a transmitting station communicates with multiple receiving stations through different communication links. Different communication links may require different transmission rates beyond which a receiving station will start dropping packets. While TCP can handle packet discard and re-transmission, the result is degradation of the overall system performance. The difference in transmission rate between communication links can be attributed to many factors. For example, the receiving station is located one or more switch or hub away from the transmitting station and may be on a slow link, which can be as slow as half-duplex at 10 Mbps. There may be many-to-one congestion at a particular link, i.e. too many nodes transmitting to the node. The receiving station's TCP stack may not be efficient in handling packets.

A transmit port of a fast NIC is likely to be connected to a fast link and capable of sending packets at much faster rates than some downstream links can process. The Institute of Electrical and Electronic Engineers (IEEE) 802.3x standard specifies a port-based flow control, which works if a switch can support it, to flow the control to the transmitting port. This type of flow control can create head-of-line blocking and causes all nodes receiving from this transmitting port to be slowed down.

Accordingly, it would be greatly desirable to be able to pace the transmission of packets from a transmitting station to different receiving stations based on the bandwidth of each communication link associated with a particular receiving station, thereby optimizing the performance of the overall network performance.

SUMMARY OF THE INVENTION

The present invention provides system and method of a pace engine for governing different transmission rates tailored for different communication links by transmit rate pacing a plurality of queues from a transmit DMA queue manager. The pace engine includes a binning controller for receiving the plurality queue identifiers from the transmit DMA queue manager and determines a pace value containing an inter-packet-gap associated with a particular transmit queue. The binning controller also calculates the earliest allowed exit time for each queue identifier that is stored and paced in a Fast Bin or a Slow Bin. A queue identifier that has a zero wait time is transmitted from the binning controller to the Work Bin directly for immediate transmission given that the queue identifier cannot be throttled. A pace table is coupled to the binning controller, stores information about the pace values containing the minimum inter-packet-gaps for various transmit queues. A timer is coupled to the binning controller with a multi-bit continuous counter that increments at a predetermined time unit and wraps around after a predetermined amount of time.

An arbiter includes a first multiplexer for arbitrating multiple inputs coupled to the Fast Bin and selects a first input having the highest priority to pass through first from the binning controller to the Fast Bin, a second input having the medium priority to pass through second from the binning controller to the Fast Bin, and a third input having the lowest priority to pass through last from the binning controller to the Fast Bin. The arbiter also includes a second multiplexer for arbitrating multiple inputs coupled to the Slow Bin, and selects a first input having a first priority to pass through first from the binning controller to the Slow Bin, and a second input having a second priority to pass through second from the binning controller to the Slow Bin. The arbiter further includes a third multiplexer, coupled between the Work Bin, the Fast Bin, and the transmit DMA queue manager, for arbitrating between a first input and a second input for generating a pace engine output to the transmit DMA queue manager.

Broadly stated, a system for pacing transmission of a plurality of transmit queues in a host memory accessible to a network interface device via a communication bus comprises a plurality of bins; an output arbiter coupled to select one of the bins, in accordance with a bin priority scheme, the bins being accessible by the output arbiter without accessing the communication bus; and a binning controller for assigning data packets from the plurality of transmit queues to the plurality of bins in dependence upon a value of a packet transmit rate parameter associated with the transmit queue from which each data packet is derived.

Advantageously, the present invention enhances the overall network performance by classifying and sending queue identifiers to different bins based on a pace value associated with a particular transmit queue. The present invention also advantageously reduces or eliminates many-to-one congestions that may occur at a particular communication link.

The structures and methods regarding to the present invention are disclosed in the detailed description below. This summary does not purport to define the invention. The invention is defined by the claims. These and other embodiments, features, aspects, and advantages of the invention will become better understood with regard to the following description, appended claims and accompanying drawings.

BRIEF DESCRIPTION OF THE DRAWINGS

The invention will be described with respect to specific embodiments thereof, and reference will be made to the drawings, in which.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1:
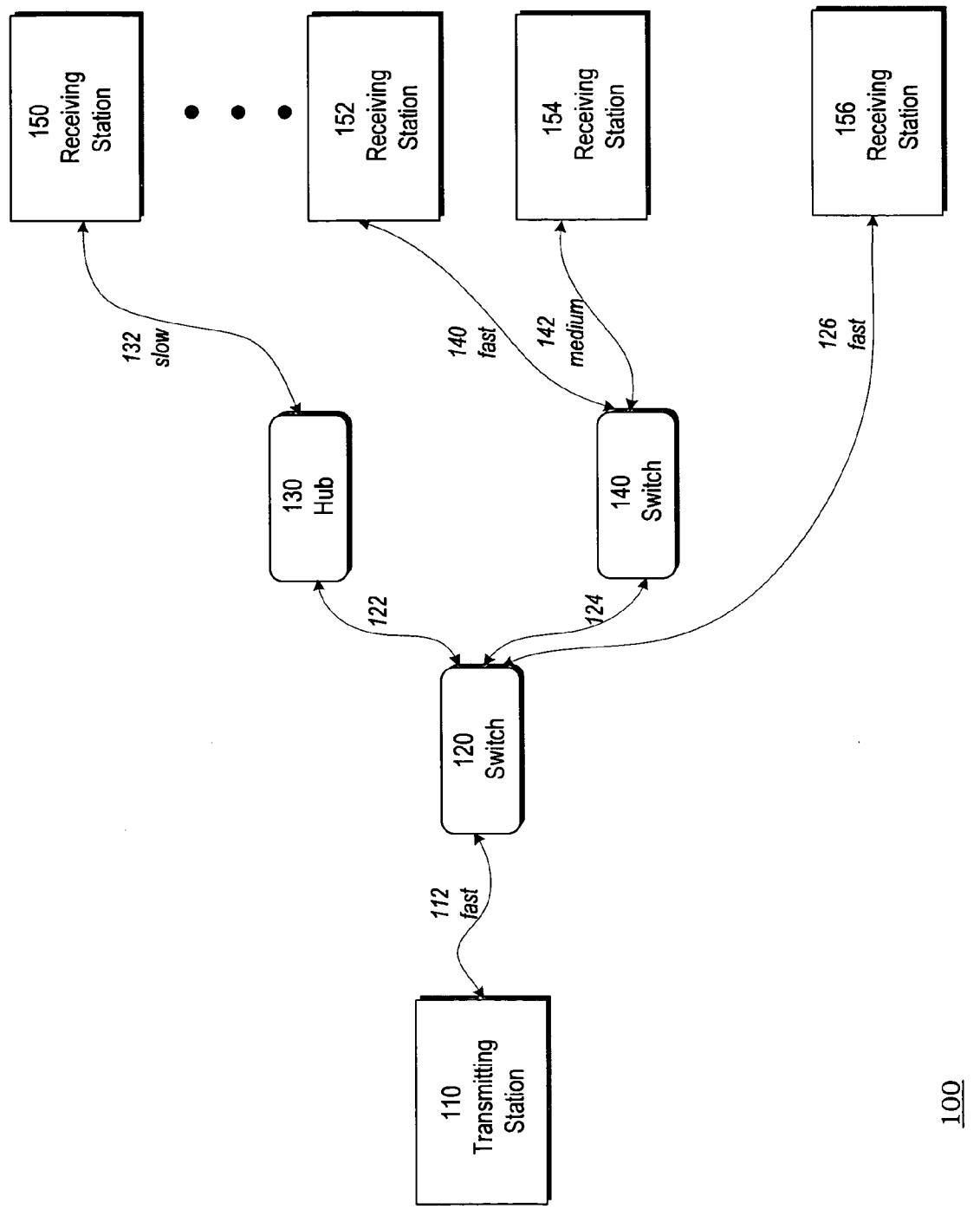
FIG. 1 is a simplified architectural diagram illustrating a network topology with mixed transmission rates between a transmission station and receiving stations in accordance with the present invention.

Referring now to FIG. 1, there is shown a simplified architectural diagram illustrating a network topology 100 with mixed transmission rates between a transmitting station 110 and receiving stations 150, 152, 154 and 156. Each of the receiving stations 150, 152, 154 and 156 has a maximum packet rate for receiving packets from the transmitting station 110. For intelligent allocation of network resources, the transmitting station 110 spaces out the rate of packet transmission to a receiving station as a fast rate of packet transmission, a medium rate of packet transmission, or a slow rate of packet transmission as determined by the maximum packet rate for a particular receiving station.

The transmitting station 110 is coupled to a first switch 120 via a fast communication link 112. The first switch 120 is commonly coupled to a hub 130 via a communication link 122 and a second switch 140 via a communication link 124. The hub 130 is coupled to the receiving station 150 via a slow link 132. The second switch 140 is coupled to the receiving station 152 via a fast link 140 and is further coupled to the receiving station 154 via a medium link 142. The first switch 120 is coupled to the receiving station 156 via a fast link 126. The various communication links, including the fast link 112, the medium link 142, and the slow link 131, may be implemented as wireline links, optical links, wireless links, satellite or any other mechanism for communication of information.

The maximum packet rate that a receiving station is able to accept determines whether a communication link will be categorized as a fast link, a medium link or a slow link. The receiving stations 152 and 156 have a maximum packet receiving rate that is considered to be fast, and therefore the communication links 140 and 126 are labeled as fast links. The receiving station 150 has a maximum packet receiving rate that is considered slow, and therefore the communication link 132 is labeled as a slow link. The receiving station 154 has a maximum packet receiving rate that is between fast and slow, which is considered a medium speed, and therefore the communication link 142 is labeled as a medium link.

A network utilization can be significantly improved by pacing packets transmitted from the transmitting station 110 to the receiving stations 150, 152, 154 and 156 based on the maximum packet rate that is permitted at a particular receiving station. If a receiving station receives packets at a rate that exceeds the maximum packet rate, the transmitted packets will not be accepted by the receiving station. The excess packets will be dropped by the receiving station, thereby occupying network resources without effective usage. For optimization of network resources, the transmitting station 110 governs the transmission rate of packets over each communication link 132, 140, 142, or 126 so that the fast links 140 and 126 receive a fast transmission rate of packets to the receiving stations 152 and 156, the slow link 132 receives a slow transmission rate of packets to the receiving station 150, and the medium link 142 receives a medium transmission rate of packets to the receiving station 154.

In one embodiment, the transmit rate pacing is individually determined for each transmit link, as dictated by the maximum packet reception rate of a receiving station. The transmit rate pacing of the present invention can be implemented in either software or hardware. For software-based transmit rate pacing, after sending a packet to hardware, software will need to wait for a predetermined amount of time, e.g. set a timer and wait for the timer to expire, before transmitting another packet. A hardware-based transmit rate pacing eliminates the waiting period between the packets as required by software. Rather, hardware is able to queue all of the packets into hardware in the transmitting station 110 where the hardware spaces out the packets for transmission.

Figure 2:
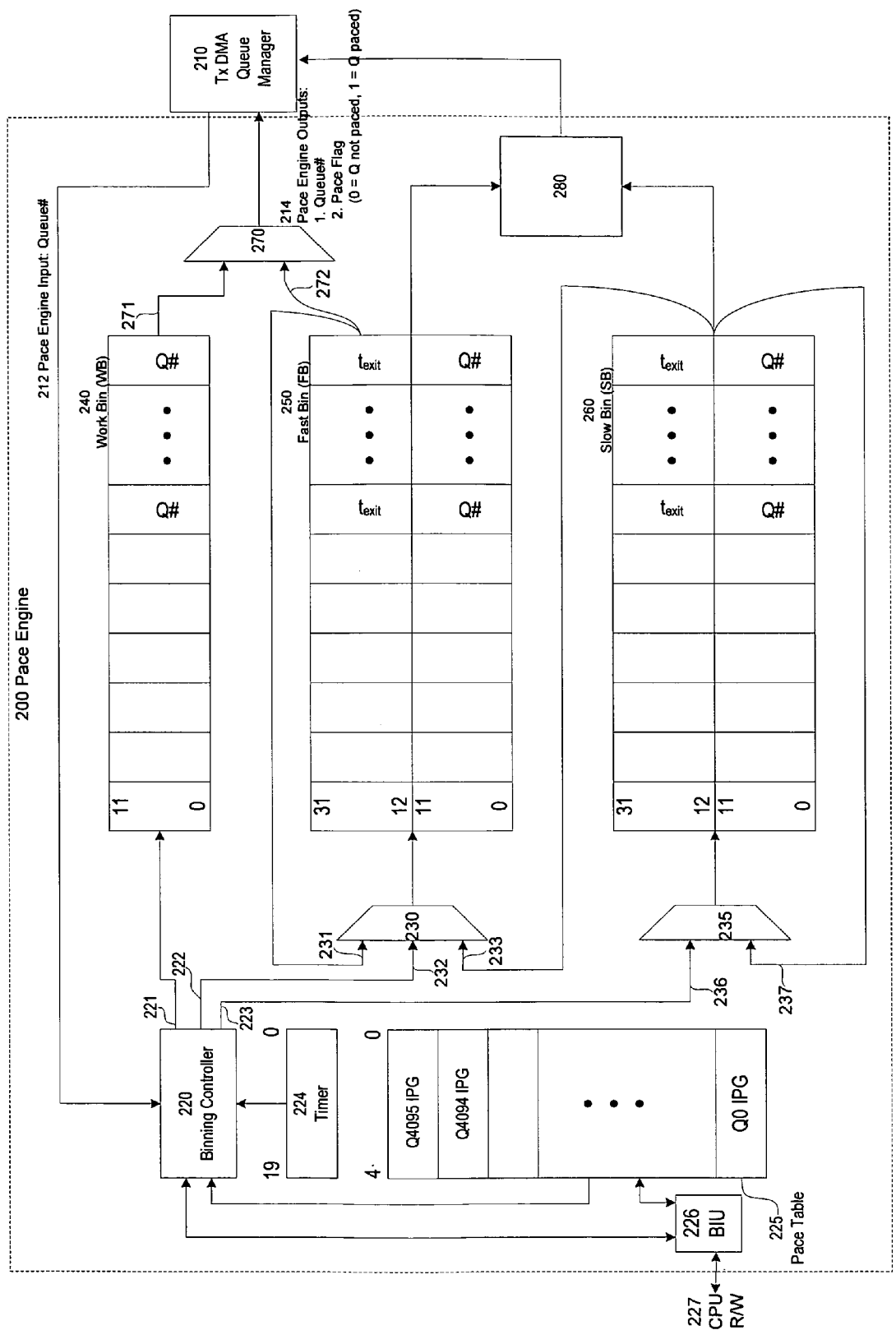
FIG. 2 is a block diagram illustrating a pace engine for spacing out queue identifiers into different bins based on the value of an inter-packet-gap associated with a particular transmit queue in accordance with the present invention.

As shown in FIG. 2, there is a block diagram illustrating a pace engine 200 for spacing out queue identifiers into different bins based on an inter-packet-gap associated with a particular transmit queue. The transmit DMA queue manager 210 sends a plurality of queue identifiers to a binning controller 220. The binning controllers classifies the plurality of queue identifiers to either a Work Bin (WB) 240, a Fast Bin (FB) 250, or a Slow Bin (SB) 260 based on a pace value containing an inter-packet-gap associated with a particular transmit queue. Therefore, data packets to be transmitted from the plurality of queue identifiers are spaced out so that those from the highest priority queues are transmitted first, those from the medium priority queues are transmitted second, and those from the lowest priority queues are transmitted last.

In one embodiment, the pace engine 200 typically manages thousands of connections that are mapped into 4 K (4096) transmit DMA queues (TxQs). Software running in the host computer has knowledge of the acceptable packet rate for each connection, which can be obtained by analyzing the number of dropped packets and/or by monitoring the arrival rate of responses and acknowledges during operations of a network. Software programs into the NIC pace table 225, a pace value for each of the 4 k queues. By default, pace values are set to 0 and queues are not paced.

Some characteristics that are desirable in the implementation of the hardware rate pacing are described as follows. The packet-level flow control should be adequate so that the inter-packet-gap (IPG) is modulated to achieve the right pace. The term "packet-level" means that hardware is not required to break up packets or count bytes for the purpose of rate pacing. One overriding objective is to achieve a minimum inter-packet-gap, although there is no maximum inter-packet-gap constraint. In the event that there are more connections than queues, software is responsible for assigning similar data rate connections to the same Tx queue. Each queue typically has just one pace value.

The pace engine 200 includes two interfaces for external communication. The first interface is for interfacing with a central processing unit (CPU) to program pace values for each transmit queue and other control registers. The second interface is for interfacing with the Tx DMA Queue Manager 210 to obtain a queue identifier (or number) of the pending transmit DMA. The pace engine 200 generates an output to the Tx DMA Queue Manager 210 with the identification of the queue that is ready for the next DMA transmission. A bus interface unit 226 is coupled to a central processing unit 227 for writing to and reading from a pace table 225 and registers. The pace table 225 is able to store K number of entries, e.g. 4,000 entries. Each entry contains a desired minimum IPG for one of the 4,000 transmit queues.

Whenever any of the DMA transmit queues is active, the DMA Queue Manager 210 places an entry into the pace engine 200 before acting on a packet or descriptor. It does so by sending the queue number of the active transmit queue to the binning controller 220. The binning controller 220 detects the value of the inter-packet-gap desired for the DMA channel that is associated with the queue number. The binning controller 220 runs an arbitration scheme to determine whether to route the queue number via a path 221 to the Work Bin 240, via a path 222 to the Fast Bin 250, or via a path 223 to the Slow Bin 260. The binning controller 220 computes an earliest allowed exit time for the queue number being paced, based on the current time value plus the inter-packet gap for the current queue number, and stores the exit time in either the Work Bin 240, the Fast Bin 250, or the Slow Bin 260. A timer 224 is coupled to the binning controller 220 with a 20-bit continuous counter with 1 μs increments and wraps around at 1 second.

Pacing thresholds for the Work Bin 240, the Fast Bin 250, or the Slow Bin 260 can vary depending on a designer's specification. In one embodiment, the Work Bin 240 stores queue identifiers (IDs for queues) that need not be paced. Pacing is not needed when a pace table entry for a queue is 0 or when a queue was previously idle, where the first packet after idle is not paced regardless of pace table value. In one embodiment, three classifications of queue identifiers are used: a first classification that places queue identifiers in the Work Bin 240, a second classification that places queue identifiers in the Fast Bin 250, and a third classification that places queue identifiers in the Slow Bin 260. If a queue identifier has a zero IPG, the binning controller 220 sends the queue identifier to the Work Bin 240 for immediate processing. Effectively, the Work Bin 240 functions like a FIFO buffer. Secondly, the Fast Bin 250 stores queue identifiers for queues allowed to be transmitted in the next N micro seconds (μs), where the parameter N is a programmable value (e.g., 5 μs). If a queue identifier has a non-zero and short IPG, the binning controller 220 sends the queue identifier to the Fast Bin 250. Thirdly, the Slow Bin 260 stores queue identifiers for queues not allowed to be transmitted in the next N μs. If a queue identifier has a non-zero and long IPG, the binning controller 220 sends the queue identifier to the Slow bin 260.

One way to keep track of an entry is by time stamp. Whenever an entry is received, the entry is stamped with a timer 224. The timer can be implemented in a wide variety of ways, such as stamping with a current time. When an entry enters the pace engine 200, the binning controller 220 adds the current time and the IPG to produce the desired exit time associated with the entry. The Work Bin 240 has no desired exit time because an entry into the Work Bin 240 means immediate transmission. Entries in both the Fast Bin 250 and the Slow Bin 260, however, have a desired exit time, denoted by the symbol $t_{exit}$. The desired exit time, $t_{exit}$ refers to the earliest time that the Tx DMA Queue Manager 210 can transmit a packet associated with a queue identifier.

Each multiplexer in a first multiplexer 230 and a second multiplexer 235 acts like an arbitration for different inputs. The first multiplexer 230 and the second multiplexer 235 operate to facilitate the binning algorithm in the arbitration of queues in the Fast Bin 250 and the Slow Bin 260. The binning controller 220 receives a queue identifier that has a zero IPG from the Tx DMA Queue Manager 210. The binning controller 220 transfers the queue identifier via the path 221 to the Work Bin 250. The Work Bin 250 receives the queue identifier that originates from just one source, the Tx DMA Queue Manager 210.

The first multiplexer 230 arbitrates between three inputs, a first input from the path 231, a second input from the path 232, and a third input from the path 233 for generating an output that is coupled to an input of the Fast Bin 250. Among the three inputs into the first multiplexer 230, the first priority is the second input via the path 232 received by the first multiplexer 230 that originates from the Tx DMA Queue Manager 210. The first multiplexer 230 receives the queue identifier from the Tx DMA Queue Manager 210, either because the exit time associated with the entry is more distant than a fast bin threshold but nearer than a slow bin threshold, or because the exit time is nearer than the fast bin threshold but the FIFOs in the Work Bin 240 are full. The second priority comes from the first input via the first path 231 received by the first multiplexer 230 that originates from the Fast Bin 250 which recycles the queue identifier from the head of the Fast Bin 250 back to its tail because the exit time value of the entry is still farther away than a fast bin threshold. The third priority comes from the third input via the third path 233 received by the first multiplexer 230 that originates from the Slow Bin 232 because the exit time value of the entry is nearer than a slow bin threshold.

The second multiplexer 232 arbitrates between the two inputs, a first input from the path 236 and a second input from the path 237, for generating an output that is coupled to an input of the Slow Bin 260. Among the two inputs coupled to the second multiplexer 235, the first priority comes from the first input via the first path 236 received by the second multiplexer 235 that originates from the Tx DMA Queue Manager 210. The second multiplexer 235 receives the entry from the Tx DMA Queue Manager 210, either because an incoming entry has an exit time more distant than a slow bin threshold or because the FIFOs in both the Work Bin 240 and the Fat Bin 250 are full. The second priority comes from the second input via the first second path 237 received by the second multiplexer 230 that originates from the Slow Bin 260 by recycling the entry back into the Slow Bin 250 because its exit time is still more distant than the slow bin threshold.

When the third multiplexer 270 generates an output to the Tx DMA Queue Manager 210, the queue will contain the queue identifier and a pace flag, indicating whether the queue is paced by setting a parameter Q=0 if the queue is paced, or setting the parameter Q=1 if the queue is not paced. In one embodiment, the first input 271 from the Work Bin 240 has a higher priority than the second input 272 from the Fast Bin 250. However, as an optional feature, a fairness scheme can be implemented so that periodically queue identifiers from the Fast Bin 250 will be selected by the third multiplexer 270 for sending outputs to the transmit DMA Queue Manager 210 so that queue identifiers in the Fast Bin 250 are not always waiting until the FIFOs in the Work Bin 240 are all cleared before an opportunity to transmit.

Table 1 below briefly summarizes the functional block description in the pace engine 200.

TABLE 1

| Sub-Block | Description |
|---|---|
| BIU | Bus interface unit to allow software running in the host computer system to write and read the pace table and registers. |
| Pace Table | 4K entries containing desired minimum IPG for each of the 4K queues. |
| Timer | 20-bit continuous counter with 1 μsec increments, wraps around at 1 second. |
| Binning Controller | Computes earliest allowed exit time for a queue being paced and stores in the Work Bin, Fast Bin or Slow Bin accordingly. |
| Work Bin | Stores queue identifiers that need not be paced; this can either be when the pace table entry is 0 or when this queue was previously idle (first packet after idle is not paced regardless of pace table value). |
| Fast Bin | Stores queue identifiers allowed to transmit in the next N μsec where N is programmable (e.g. 5 μsec). |
| Slow Bin | Stores queue identifiers not allowed to transmit in the next N μsec. |
| Full Logic | Handles the condition when a queue identifier is either Fast or Slow bin is full. |

Software interface to the pace engine 200 is described below. The term "pace" is defined as time per packet transmitted. In one embodiment, a granularity of 1 μsec per pace unit is used, which is equivalent to 125 byte times in a 1 Gbit/sec. Link, which is time in a reasonable time unit. The pace table is typically accessible by a CHAR driver running in the kernal. In one embodiment, user-level access is not permitted as a security measure to protect the pace table from unauthorized access. In such embodiment where a user does not have access to the pace table, the user makes a system call to a kernel resident device driver, and the kernel writes to the pace table. In another embodiment, user-level access is permitted so that the user-level driver writes directly to the pace table.

If pacing is required for operation with a slow TCP link, the worst IPG that a packet may require is at half-duplex and 10 Mbps with maximum backoff intervals equaling 16 collision retries. The cumulative progressive backoff maximum can be computed as follows: 1+2+4+8+16+32+64+128+256+512+ 1K+1K+1K+1K+1K+1K=7K slot times (one slot is 64 byte times). Therefore, the maximum backoff time is about ~360 msec, which requires a 19-bit timer counting at 1 μsec increments. In one embodiment, the pacing is supported up to 1 second.

To save pace table memory space, pace values are stored according to an exponential coding as follows:

| Pace Table Value | Pace IPG |
|---|---|
| 0 | $2^0 = 0$ μsecond |
| 1 | $2^1 = 2$ μsecond |
| 2 | $2^2 = 4$ μsecond |
| ... | ... |
| 19 | $2^{19} \approx$ ½ second |
| 20 | $w^{20} 20 \approx 1$ second |
| >20 | Reserved |

Besides programming the pace table, software also typically programs the following parameters. The programming of a binning threshold indicates the control binning into the Fast Bin 250 or the Slow Bin 260. This threshold is sometimes referred to herein as a slow bin threshold. In some embodiments, there may also be a fast bin threshold, programmable or not, to control binning as between the Work Bin 240 and the Fast Bin 250. But in one embodiment, the fast bin threshold is fixed and assumed, so that only queue numbers having an IPG=0 go into the Work Bin 240. In another embodiment, there may be only two or more of these bins, in which case there may be a corresponding number of fixed or programmable binning thresholds. The programming of a "bin partition" reflects that the Fast Bin 250 and the Slow Bin 260 share a single dual-port memory to provide flexibility in expanding or shrinking the bin according to the connection profile, which typically cannot be dynamically modified. If a re-partitioning is required, software will execute the following operations: flush all active queues first, modify the partition, reset pace WB, FB, and SB pointers, and re-start Tx DMA.

For user level queues, the location in the NIC where its IPG is stored is memory mapped into the memory space of that user level driver so that the user writes a modified IPG value without going through the Kernel. One reason that software changes the IPG is that the user-level stack follows a standard algorithm (e.g. TCP) for that particular connection.

Figure 3:
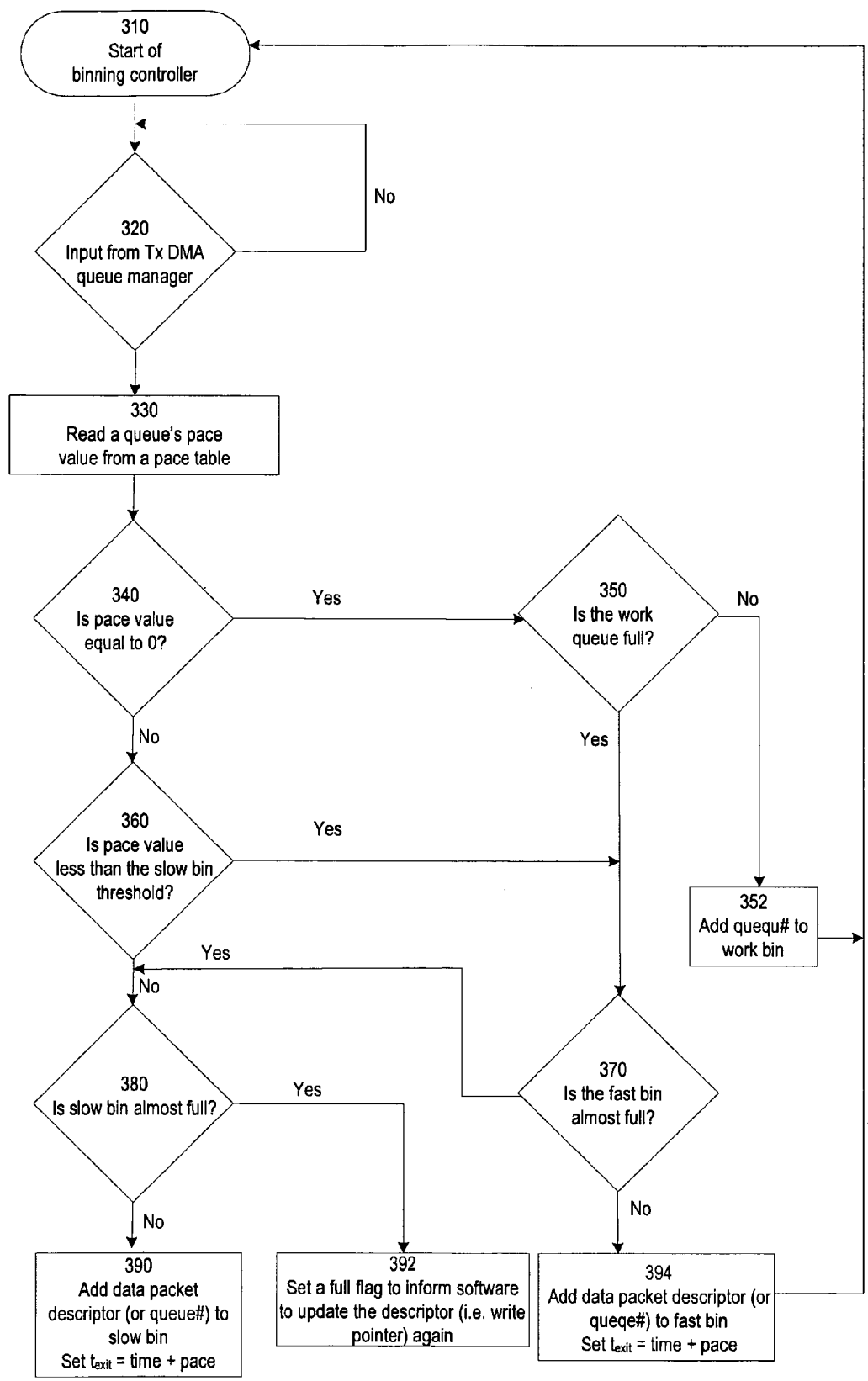
FIG. 3 is a flow chart illustrating the pace input flow of the pace engine in accordance with the present invention.

Turning now to FIG. 3, there is shown a flow chart illustrating the process 300 of the pace input flow. The binning controller 200 computes the earliest allowed exit time, $t_{exit}$, for each queue identifier and stores the value of each exit time in the Work Bin 240, the Fast Bin 250 or the Slow Bin 260 accordingly. The process 300 starts at step 310 of the decision-making process in the operational flow of the binning controller 200. At step 320, the process 300 updates a descriptor queue write pointer to the Tx Queue Manager 210. The Tx Queue Manager 210 monitors the descriptor queue write pointers such that if there is work to perform, the Tx Queue Manager 210 generates an output with an entry containing the queue identifier to the pace engine 200. There is no work to be done if the descriptor queue is empty, in which the Tx DMA Queue Manager 210 waits for an entry in the descriptor queue.

At step 330, the process 300 retrieves the pace value associated with a transmit queue of a queue identifier from the pace table 225. The queue identifier is added to a FIFO in either the Work Bin 240, the Fast Bin 250 or the Slow Bin 260 based on the pace value. Non-paced queues are added to the Work Bin 240 unless the Work Bin 240 is full, in which case it overflows into the Fast Bin 250. If the pace value for the queue identifier is less than a slow bin threshold, the binning controller 220 sends the queue identifier to the Fast Bin 250. If the pace value for the queue identifier is greater than the slow bin threshold, the binning controller 220 sends the queue identifier to the Slow Bin 260. If the Slow Bin 260 or the Fast Bin 250 is determined to be almost full, a full flag is set to inform the process 300 that it needs to update the descriptor write pointer. In addition to the queue identifier, an earliest exit time entry is also added to the Fast Bin 250 and the Slow Bin 260. The earliest exit time is obtained by adding the pace value to the current time provided by the timer 224. When an entry is exiting a bin in either the Fast Bin 250 or the Slow Bin 260, the current time at the time of exit is compared with the recorded earliest exit time, $t_{exit}$.

At step 340, the process 300 determines whether the pace value is equal to zero. If the pace value is equal to zero, the process 300 proceeds to step 350 to determine whether the Work Bin 240 is full. If the Work Bin 240 is not yet full, the process 300 adds a queue number to the Work Bin. If the pace value is not equal to zero, the process 300 proceeds to determine whether the pace value is less than the threshold of the Fast Bin 250 at step 360.

In both scenarios where the Work Bin 240 is full and where the pace value is less than the slow bin threshold, the process 300 proceeds to determine whether the Fast Bin 250 is almost full at step 370. If the Fast Bin 250 is not almost full, the process 300 at step 394 adds a queue number to the Fast Bin 250, and sets the parameter, $t_{exit}$, equal to the current time plus the pace value. The process 300 then returns to the start of the binning controller at step 310. The Work Bin 240 and the Fast Bin 250 are both allowed to exit the pace engine 200. The Work Bin 240 is allowed to exit unconditionally, while the Fast Bin 250 is allowed to exit when the earliest exit time has passed. A reasonable algorithm can be used to arbitrate between the two exits, as transmitted from the Work Bin 240 and the Fast Bin 250. When a fast bin exit entry has not met the earliest exit time criteria, the entry is recycled back to the Fast Bin 250.

If the pace value is not less than the slow bin threshold, at step 380, the process 300 proceeds to determine whether the Slow Bin 260 is almost full. At step 390, the process 300 adds a queue number to the Slow Bin 260 by setting the parameter $t_{exit}$ equal to the current time plus the pace value if the Slow Bin 260 is not almost full. At step 392, the process 300 sets a full flag to inform software to update the descriptor (i.e., a write pointer) again if the Slow Bin 260 is almost full. When an entry has an earliest exit time that is within a programmable binning threshold, the entry from the Slow Bin 260 can be upgraded to the Fast Bin 250. If the entry is not upgraded, the entry is recycled back to the Slow Bin 260. The output controller keeps sorting and recycling continuously through the Fast Bin 250 and the Slow Bin 260 to avoid the situation of some ready-to-exit queues being stuck in the respective Fast and Slow bins 250, 260. When a queue exits the pace engine 200, the transmit DMA Queue Manager 210 processes the queue identifier according to the flow as described with respect to FIG. 4.

Figure 4:
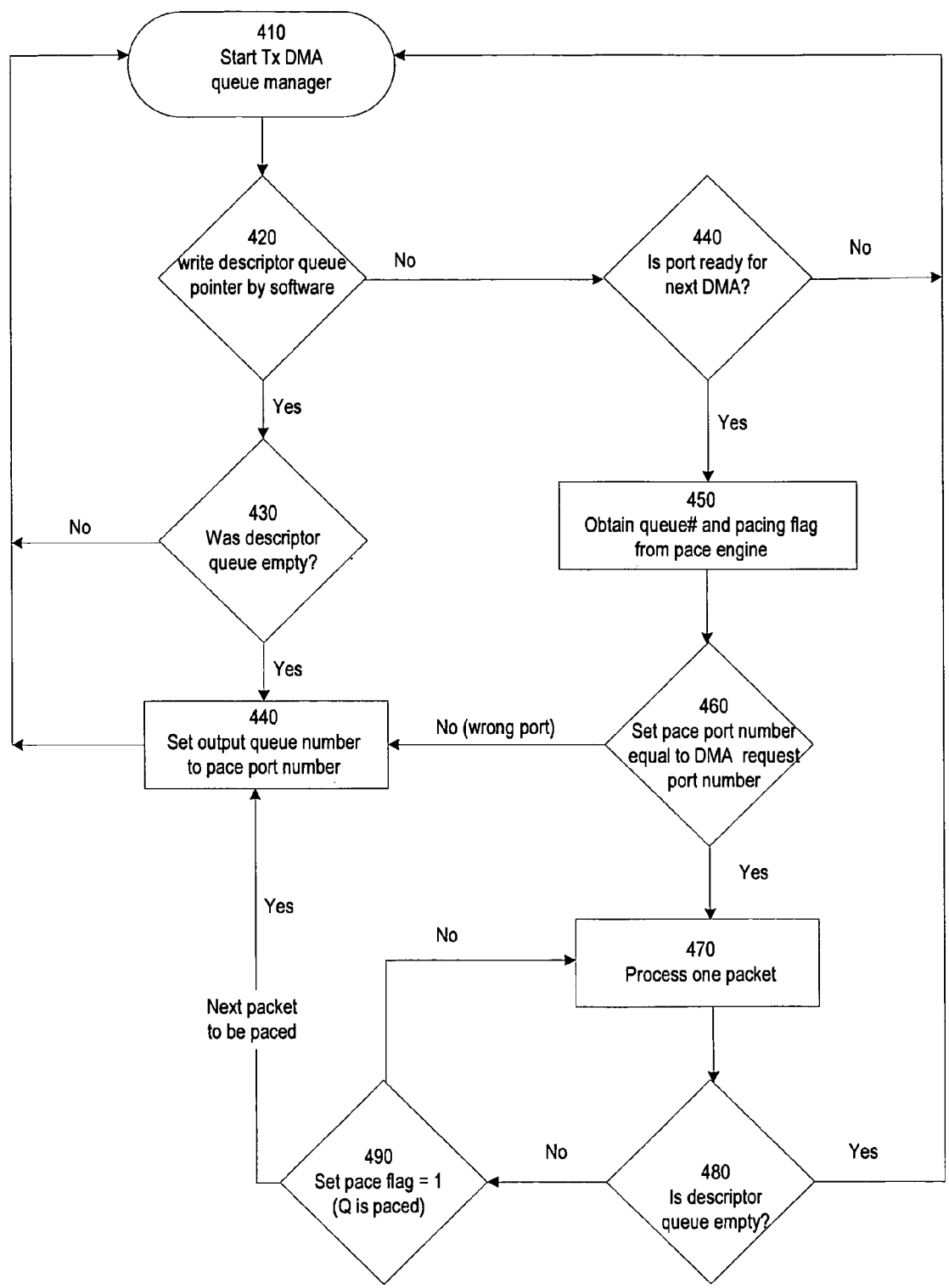
FIG. 4 is a flow chart illustrating the process of a transmit DMA queue in accordance with the present invention.

In FIG. 4, there is a flow chart illustrating the process 400 of a transmit DMA Queue Manager that has two ports. At step 410, the transmit DMA Queue Manager 210 starts by receiving a queue identifier from the pace engine 200. In one embodiment, the pace engine 200 does not distinguish between the 2 transmit ports at the transmit DMA Queue Manager 210. At step 420, software writes the descriptor queue pointer. At step 430, the Tx DMA Queue Manager 210 determines if a port is ready to perform the next DMA operation. If the port is not yet ready, the process 400 returns to step 410. When the queue exits the pace engine 200 but that particular port is not yet ready, the queue is recycled back to the pace engine 200. At step 450, the Tx DMA Queue Manager obtains the queue number and pacing flag from the pace engine 200. At step 460, the Tx DMA sets a pace port number equal to a DMA request port number. If the pace port number matches the DMA request port number, the Tx DMA manager 210 processes one packet if the queue is not paced at step 470. If the pace port number does not match the DMA request port number, the Tx DMA Queue Manager 210 proceeds to step 440. If the queue is paced and there are multiple packets to transmit, after DMA each packet, the queue ID is returned to the pace engine 200 to be paced again. If the queue is not paced and there are multiple packets to transmit, the Tx Queue Manager 210 will process all of the packets in the queue. If the descriptor queue is empty at step 480, the process 400 returns to step 410. If the descriptor queue is not empty, at step 480, the pace flag sets to a value of 1. If the queue is not paced, the process 400 goes back to step 470 to process one packet at a time. If the queue is paced, the process 400 continues to step 400 to set the output queue number to the pace port number.

At step 430, if the descriptor queue is empty, the process 400 returns to step. 410. However, if the descriptor queue is not empty, the process 400 proceeds to step 440 to set an output queue number equal to the pace port number. The process 400 then returns to step 410 at the start of the Tx DMA Queue Manager.

In an alternative embodiment, the Tx DMA Queue Manager 210 has two output queues, a first queue for the port 0 and a second queue for the port 1, where the designation between the port 0 and the port 1 is encoded with a single bit.

Figure 5:
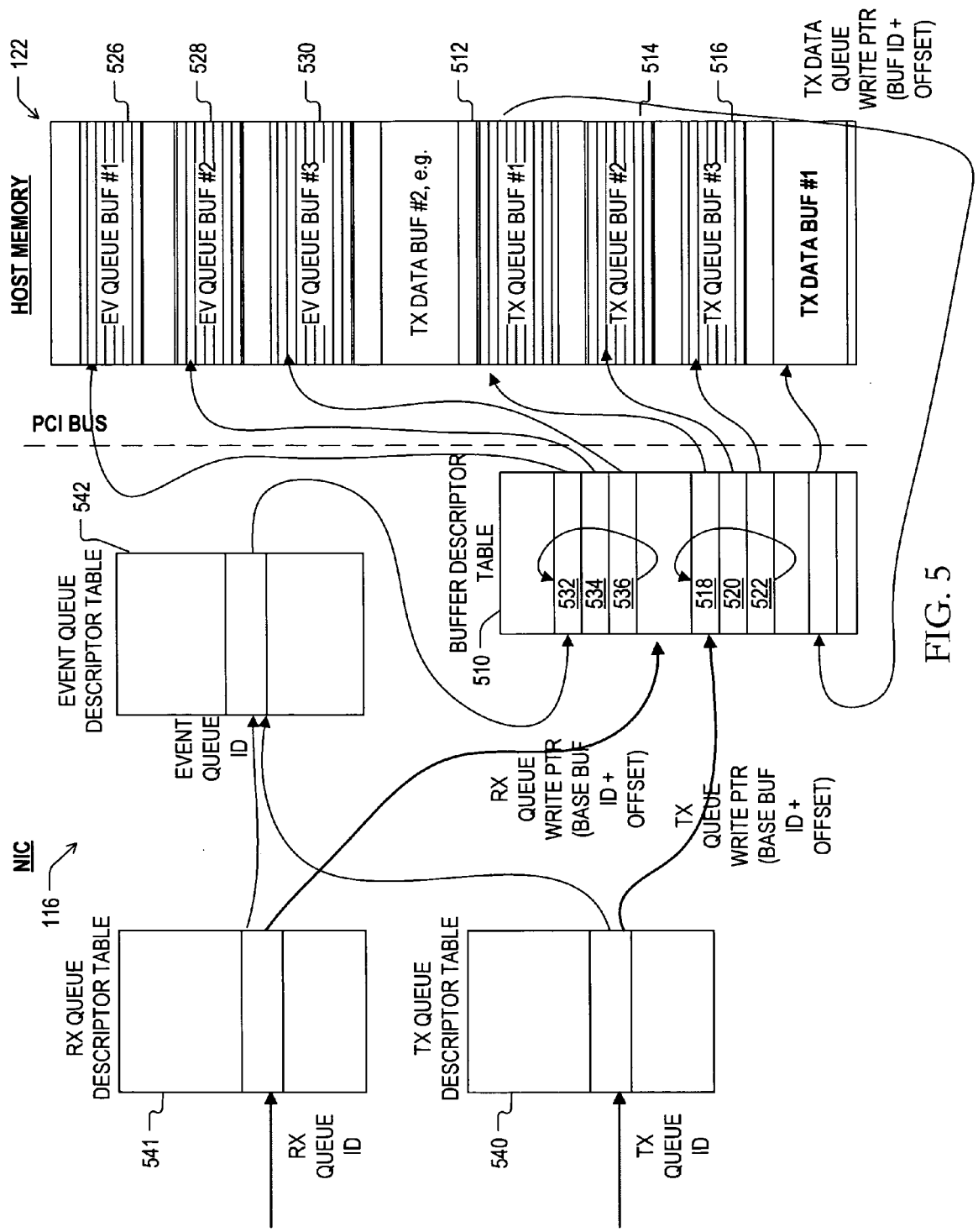
FIG. 5 is a block diagram of data structures illustrating transmit (and receive) queues for different VNICs in accordance with the present invention.

As illustrated in FIG. 5, there is shown a block diagram of data structures illustrating transmit (and receive) queues. The diagram indicates which structures exist in a host memory (not shown) and which exist on a NIC (not shown). The transmit and receive data buffers, the transmit and receive DMA descriptor queues, as well as one or more event queues, are all resident in the host memory and made up of generalized buffers which can be discontiguous and interspersed with each other in the host memory. In FIG. 5, the buffers being used as transmit data buffers are identified as "TX DATA BUF #n", and the buffers being used for a TX DMA command queue (or more simply, a transmit queue) are identified as "TX QUEUE BUF #n". The buffers being used for the event queue are identified as "TX EV QUEUE BUF #n". Additional buffers in the host memory, not shown explicitly in FIG. 5, are used for receive data buffers and for a RX DMA command queue (also called simply a receive queue). One process running on the host system may have any number of transmit, receive and event queues, and all of them share the pool of generalized buffers that have been mapped into that process's virtual address space. Other processes uses a different pool of generalized buffers mapped into their respective virtual address spaces.

Individual buffers may be either 4 k or 8 k bytes long in one embodiment, and they are chained together into logically contiguous sequences by means of physically contiguous descriptors in a buffer descriptor table 510 stored in the NIC. For example, one transmit queue might occupy buffers 512, 514 and 516 in the host memory, which are discontiguous and possibly out-of-order regions of memory. They are chained together into a single logically contiguous space by the physically contiguous entries 518, 520 and 522 in the buffer descriptor table 510. The entries 518, 520 and 522 are written and managed by the host 114 and are viewed as a wrap-around ring. So for example, if the host wishes to define a transmit queue having 64 k entries for transmit data buffer descriptors, and each buffer is 4 k in size, then the host will allocate a physically contiguous sequence of 16 entries in buffer descriptor table 510 for this transmit queue. Similarly, one event queue might occupy buffers 526, 528 and 530 in the host memory. These buffers are discontiguous and possibly out-of-order in host memory, but are chained together into a single logically contiguous wrap-around space by the physically contiguous entries 532, 534 and 536 in the buffer descriptor table 510. The buffer descriptor table 510 is indexed by "buffer ID", and each of its entries identifies, among other things, the base address of the corresponding buffer in host memory 122.

In order to keep track of the state of each of the transmit, receive and event queues for the many user-level applications that might be in communication with the NIC at the same time, the NIC includes a transmit queue descriptor table 540, a receive queue descriptor table 541, and an event queue descriptor table 542. The transmit, receive and event queue descriptor tables are shown in FIG. 5 as separate tables, each containing the entire table, but it will be appreciated that in different embodiments the three tables can be implemented as a single unified table, or one of the tables can be implemented as separate sub-tables (divided by columns or by rows or by both), or some combination of these variations might be implemented. Each transmit queue has a corresponding transmit queue ID, which is used as an index into the transmit queue descriptor table 540. The designated entry in the transmit queue descriptor table 540 is the starting point for describing the state and other characteristics of that particular transmit queue, as viewed by the NIC. Each such entry identifies, among other things:

whether the queue is a kernel queue, user queue or another kind of queue;
the size of the queue (number of transmit data buffer descriptors it can contain)
the ID of the event queue associated with this transmit queue;
buffer ID of base buffer for this transmit queue;
"device centric" read and write pointers into this transmit queue.

A host (not shown) maintains "host centric" versions of the read and write pointers as well, and when it is ready to have transmit data transmitted, it so notifies the NIC by writing its updated host centric transmit queue write pointer into a "doorbell" address on the NIC of the device centric transmit queue write pointer for the particular transmit queue. This is the trigger used by the Tx DMA Queue Manager 210 to write an entry into the pace engine 200. The NIC maintains a table relating to the doorbell address to the queue number, and the Tx DMA Queue Manager 210 refers to this table to obtain the queue number.

Queue numbers exiting the pace engine 200 are used to select the next transmit queue from which a packet will be retrieved from host memory for transmission. In order to retrieve current transmit data from a particular transmit queue in the host memory, the NIC first uses the ID of the particular transmit queue to look up, in the transmit queue descriptor table 540, the buffer ID of the base buffer containing the transmit descriptor queue. The NIC also obtains from the same place, the current device centric read pointer into that transmit descriptor queue. It then uses the base buffer ID as a base, and the device centric read pointer high order bits as an offset, into the buffer descriptor table 510, to obtain the base address in the host memory of the buffer that contains the particular transmit queue. The NIC then uses that base address as a base, and as an offset the device centric transmit queue read pointer low order bits times the number of bytes taken up per descriptor, as a starting host memory address for retrieving entries from the particular transmit descriptor queue. Importantly, the NIC does not allocate separate space for maintaining a write pointer into any local cache into which these entries will be written.

Each entry in the particular transmit descriptor queue contains, among other things:

the buffer ID of a transmit data buffer;
a byte offset into the transmit data buffer; and
a number of bytes to be transmitted from that transmit data buffer.

The NIC then uses the buffer ID of the current transmit data buffer as another index into buffer descriptor table 510 to retrieve the buffer descriptor for the buffer that contains the current transmit data. Note this buffer descriptor is an individual entry in buffer descriptor table 510; unlike the descriptors for buffers containing transmit queues or transmit event queues, this buffer descriptor is not part of a ring. The NIC 116 obtains the physical address in host memory 122 of the current transmit data buffer, and then using that physical address as a base, and the byte offset from the transmit descriptor queue entry as an offset, it determines the physical starting address in host memory 122 of the current data to be transmitted.

The transmit queue descriptor table 540 entry designated by the transmit queue ID, as previously mentioned, also contains the ID of the transmit event queue associated with the particular transmit queue. Similarly, the receive queue descriptor table 541 entry designated by the receive queue ID contains the ID of the event queue associated with the particular receive queue. All of the event queues for all the applications are described by respective entries in the event queue descriptor table 542. The entry in the event queue descriptor table 542 identified by a queue ID from the transmit or receive queue descriptor table 540 or 541 is the starting point for describing the state and other characteristics of that particular event queue, as viewed by the NIC 116.

Note that as illustrated in FIG. 5, whereas each slot (e.g. 532, 534, 518) shown in the buffer descriptor table 510 represents a single descriptor, each slot (e.g. 526, 528, 514) in the host memory represents a memory "page" of information. A page might be 4 k or 8 k bytes long for example, so if a transmit data buffer descriptor in a transmit queue occupies either 4 or 8 bytes, then each slot 512,514 or 516 as shown in FIG. 5 might hold 512, 1 k or 2 k transmit data buffer descriptors.

Figure 6:
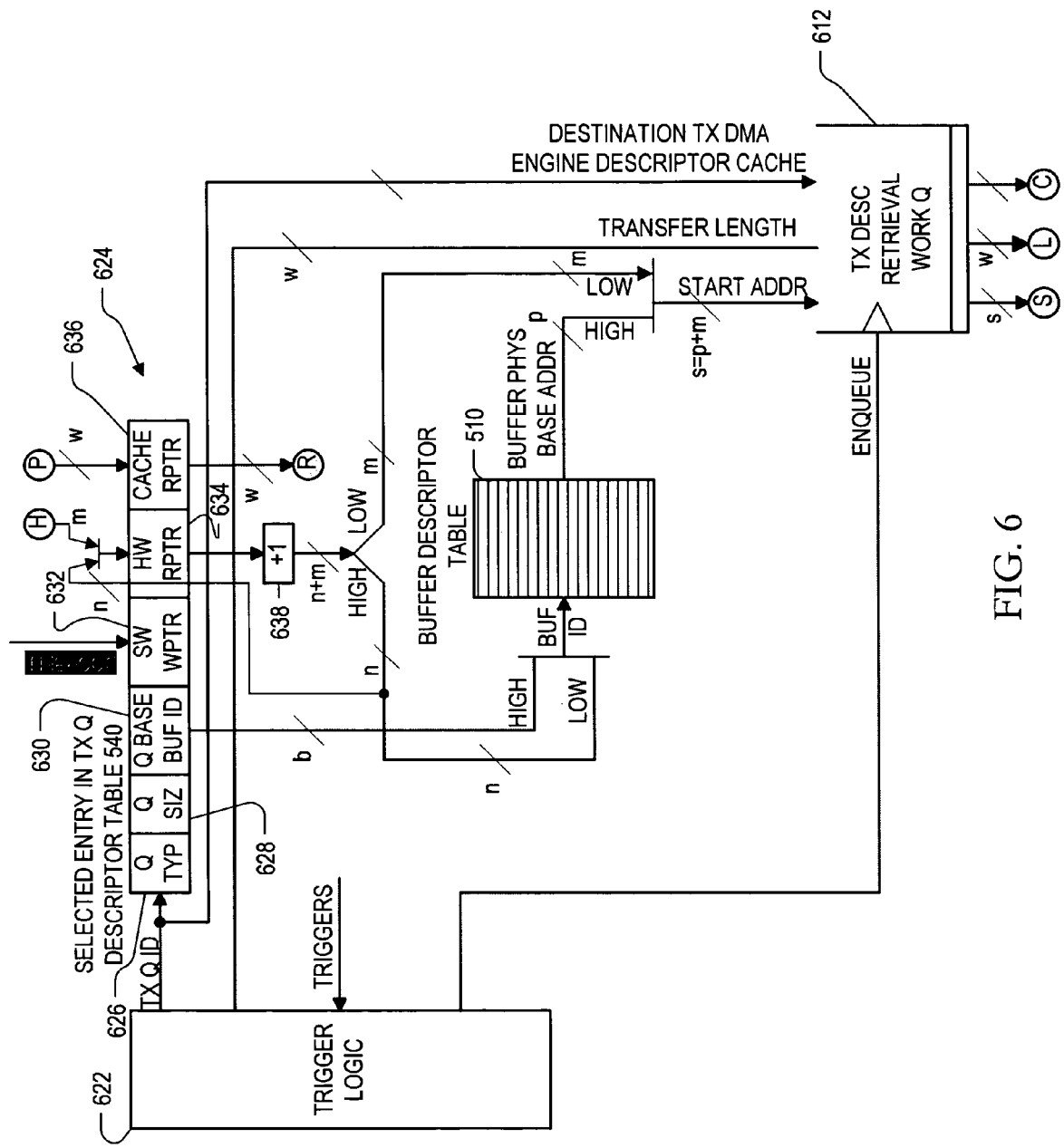
FIGS. 6 and 7 are block diagrams illustrating features in a network interface card for implementing the transmit DMA queue manager, the retrieval of transmit DMA descriptors, and the transmit data packets in accordance with the present invention.
Figure 7:
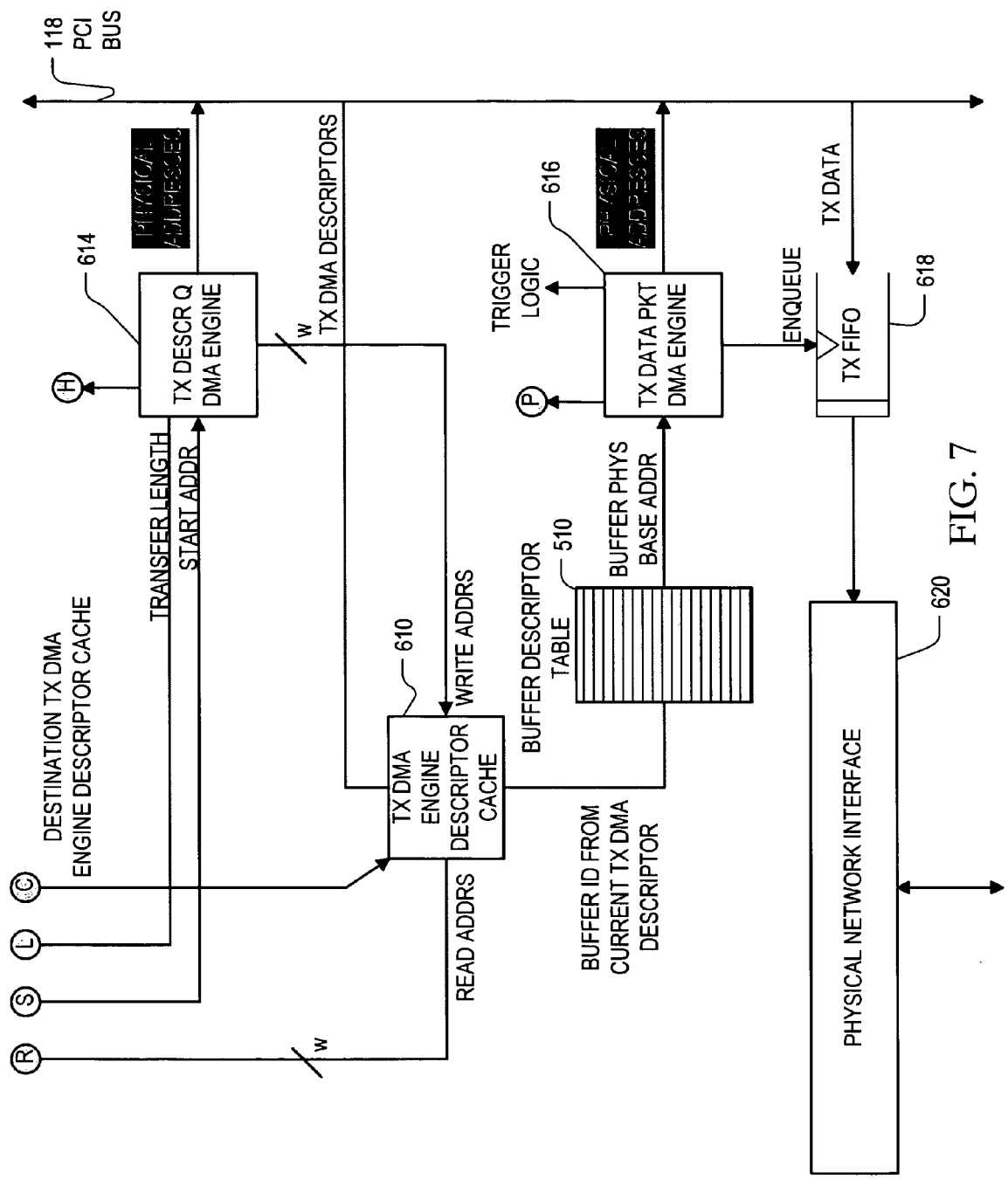

FIGS. 6 and 7 are block diagrams illustrating features in a network interface card for implementing the transmit DMA Queue Manager, the retrieval of transmit DMA descriptors, and the transmit data packets. The hardware of FIGS. 6 and 7 includes an individual transmit DMA engine descriptor cache 610 corresponding to each individual one of the transmit queues described in a transmit queue descriptor table (not shown). If the NIC supports up to 4 k transmit queues, for example, then there are 4 k transmit DMA engine descriptor caches 610. But for simplicity of illustration, only one such cache 610 is shown in the drawing. In one embodiment these caches are implemented as separate memory arrays, whereas in another embodiment they are implemented as separate regions of one or more combined memory arrays. These caches 610 maintain in essence a "jumping window" into the transmit DMA descriptors in the particular transmit queue. Each transmit DMA engine descriptor cache may include space for a number of descriptors, which may for example be on the order of 8-128 descriptors depending on the embodiment an depending on the size of each descriptor. The NIC may need only one descriptor at any particular time, but maintaining a cache of descriptors improves pipelining, and also permits the NIC to take advantage of burst transfer protocols on a PCI bus 118 for retrieving transmit DMA descriptors.

The hardware further includes a transmit descriptor retrieval work queue 612, into which DMA instructions are written for the retrieval of transmit DMA descriptors. The descriptors in the transmit descriptor retrieval work queue 612 are provided to a transmit descriptor DMA engine 614, which controls the DMA retrieval of one or more transmit DMA descriptors into the transmit DMA engine descriptor cache 610. The hardware further includes a transmit data packet DMA engine 616, which controls the retrieval of actual transmit data from a host memory into a transmit FIFO 618. Data packets at the head of the transmit FIFO 618 are driven onto a network by a physical network interface 620. Not shown in FIGS. 5 and 6 is an arbiter for arbitrating control of a bus among the transmit descriptor queue DMA engine 614 and the transmit data packet DMA engine 616, as well as a receive descriptor queue DMA engine and a receive data packet DMA engine, as well as other agents not shown.

In general operation, trigger logic and 622, in response to particular triggers such as the exiting of a transmit queue ID from the pace engine 200, selects a particular transmit queue ID from which transmit DMA descriptors are to be retrieved the next. The transmit queue ID identifies a corresponding individual entry in the transmit queue descriptor table, a portion of which is reproduced as entry 624 in FIG. 6. It can be seen that among other things, the transmit queue descriptor table includes a field 626 identifying the type of the queue. In an embodiment, a transmit queue may be a kernel queue, a user queue or another kind of queue. The transmit queue descriptor table entry 624 also includes a queue size field 628 which indicates the number of descriptors that the particular transmit queue can contain. Descriptors are of different sizes depending on the queue type, so the length of the queue in bytes depends on both the queue type field 626 and the queue size field 628.

The transmit queue descriptor table entry 624 also includes a field 630 containing the base buffer ID of the queue. A complete transmit queue can span multiple buffers in a host memory. The buffer size is usually selected to be equal to the page size of the memory. The buffers containing a transmit queue need not be contiguous in the host memory, as previously explained, as long as they are given consecutive buffer ID's. As described above, the buffer descriptor table 510 in the NIC performs a translation between buffer ID's and buffer physical base addresses.

The transmit queue descriptor table entry 624 also includes a field 632 for containing a device-centric copy of the software write pointer into the transmit queue. Whenever the driver that owns a particular transmit queue has one or more transmit data buffers ready to transmit, it writes the transmit DMA descriptors into the transmit queue in host memory and copies its updated transmit queue write pointer into this field 632 of the entry 624 of the transmit queue descriptor table. The address of field 632 is the "doorbell" address referred to above.

The transmit queue descriptor table entry 624 also includes a field 634 for containing a device-centric read pointer into the transmit queue in host memory 222. This pointer indicates an offset to the most recent transmit descriptor in the transmit queue in host memory that has been read into the NIC 216. As described in more detail hereinafter, this hardware read pointer 634 is also used to derive a write pointer into the transmit DMA engine descriptor cache 610, thereby conserving space on the integrated circuit chip. The transmit queue descriptor table entry 624 also includes a cache read pointer 636, which is used as a read pointer into the transmit DMA engine descriptor cache 610.

When an entry 624 in the transmit queue descriptor table is selected, the NIC determines the starting physical memory address from which to retrieve transmit descriptors by incrementing the value in the hardware read pointer field 634 by one (via incrementer 638), and then concatenating low order bits of the incremented hardware read pointer 634 as low order bits of the starting address, to the buffer physical base address as high order bits. It will be convenient to think of the hardware read pointer 634 as having n high order bits followed by m low order bits, the m low order bits of the incremented hardware read pointer 634 being the ones that are concatenated as low order bits of the starting address.

The starting physical memory address determined in this matter is later multiplied by the number of bytes in each transmit descriptor when it is required to specify the byte address. The buffer physical base address is the address read out from the buffer descriptor table 510 at a location identified by a provided buffer ID, which is constructed using the queue base buffer ID 630 as high order bits, and the high order n bits of the incremented hardware read pointer 634 as low order bits.

The buffer physical base address identifies the base physical address of the current buffer of transmit queue entries. The m low order bits of the incremented hardware read pointer 634 can be thought of as an offset into the current memory buffer. Since the high order bits of the incremented hardware read pointer 634 form low order bits of the buffer ID provided to the buffer descriptor table 510, it can be seen that the incrementing of the hardware read pointer 634 by incrementer 638 may cause the buffer ID to also increment. This will change the buffer physical base address output of the buffer descriptor table 510 to that of the next chained buffer of transmit queue entries. Additionally, since incrementer 638 has a fixed number of bits, buffer usage will eventually wrap around and begin again at the beginning of the first buffer in the chain. That is, the incrementer 638 increments "modulo" the length of the buffer chain. Incrementer 638 is sometimes referred to herein for that reason as a "modulo-incrementer".

The starting physical memory address determined as above is provided as part of a transmit descriptor retrieval instruction, into the transmit descriptor retrieval work queue 612. Another field of the instruction is the transfer length L, which is provided by the trigger logic 622. Yet another field of the instruction identifies the destination transmit DMA engine descriptor cache C into which the retrieved transmit descriptors will be written. C is derived from the transmit queue ID, i.e. not provided by the transport library running in the host, since each transmit queue has a respective corresponding transmit DMA engine descriptor cache. When a transmit descriptor retrieval instruction is ready, it is enqueued into the transmit descriptor retrieval work queue 612 in response to a signal from the trigger logic 622.

From the instruction at the head of the transmit descriptor retrieval work queue 612, the starting address S and transfer length L are provided to the transmit descriptor queue DMA engine 614 and the destination transmit DMA engine descriptor cache identifier C is provided to select the appropriate cache 610 into which the descriptors will be written. The DMA engine 614, after arbitrating for control of the bus, controls the DMA transfer of the descriptors from the current host memory buffer into the designated transmit DMA engine descriptor cache 610.

At the end of the transfer, the transmit descriptor queue DMA engine 614 writes an updated hardware read pointer value into the hardware read pointer field 634 of the current entry 624 of the transmit queue descriptor table 540. The low order m bits of this value represent both the offset into the last entry of the host memory transmit queue that has been read into the cache 610, and also the address in the transmit DMA engine descriptor cache 610 at which such last retrieved entry was written. Storage for these two pointers is combined into a single field, thereby saving significant space on the integrated circuit chip.

Transmit DMA descriptors are read out of the transmit DMA engine descriptor cache 610 in accordance with a w-bit read address R, stored in the cache read pointer field 636 of the selected entry 624 of the transmit queue descriptor table 540. Each transmit DMA descriptor identifies the buffer ID of the buffer in host memory 222 containing the transmit data. As shown in FIG. 7, this buffer ID is provided to the buffer descriptor table 510 (repeated in FIG. 7 for simplicity of illustration), and the corresponding buffer physical base address is read out and provided to the transmit data packet DMA engine 616 for retrieving transmit data packets. The DMA engine 616 provides physical addresses via an arbiter (not shown) onto the bus 118 for retrieving the transmit data. Retrieved transmit data is written into the tail of transmit FIFO 618, in response to an enqueue signal from the transmit data packet DMA engine 616. Data packets from the head of the transmit FIFO 618 are provided to physical network interface 620, and from there are driven out onto the network 112.

The foregoing description of preferred embodiments of the present invention has been provided for the purposes of illustration and description. It is not intended to be exhaustive or to limit the invention to the precise forms disclosed. For example, although the pace engine 200 and the input pacing flow 300 are illustrated for pacing packets, the present invention can be applied in a wide variety of technical and commercial applications which require handling of prioritizing tasks. Obviously, many modifications and variations will be apparent to practitioners skilled in this art. In particular, and without limitation, any and all variations described, suggested or incorporated by reference in the Background section of this patent application are specifically incorporated by reference into the description herein of embodiments of the invention. The embodiments described herein were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

We claim:

1. A system for pacing transmission over a network of a plurality of transmit queues in a host memory accessible to a network interface device via a communication bus, comprising at the network interface device:
   a plurality of bins, each bin having a specified pacing threshold;
   a binning controller configured to assign, for each active transmit queue, a queue identifier to one of the plurality of bins in dependence upon a packet transmit rate parameter associated with the identified transmit queue; and
   a transmit DMA queue manager configured to receive one or more queue identifiers from the plurality of bins in accordance with the pacing thresholds of the respective bins and, in response to receiving those queue identifiers, retrieve data packets from the identified transmit queues for transmission over the network.

2. A system according to claim 1, wherein the plurality of bins comprises a work bin having a first pacing threshold to which the binning controller assigns queue identifiers identifying transmit queues having a first inter-packet-gap that is less than or equal to the first pacing threshold.

3. A system according to claim 2, wherein the plurality of bins comprises a fast bin having a second pacing threshold to which the binning controller assigns transmit queues having a second inter-packet-gap that is less than or equal to the second pacing threshold but greater than the first pacing threshold.

4. A system according to claim 3, wherein the plurality of bins comprises a slow bin having a third pacing threshold to which the binning controller assigns queue identifiers identifying transmit queues having a third inter-packet-gap that is less than or equal to the third pacing threshold but greater than the second pacing threshold.

5. A system according to claim 4, further comprising a first multiplexer for arbitrating between a first input and a second input, and having an output to the fast bin, the first multiplexer having the first input for receiving queue identifiers from the binning controller, the second input for receiving queue identifiers from an output of the fast bin, and a third input for receiving queue identifiers upgraded from the slow bin.

6. The system of claim 5, wherein the second input receives queue identifiers from the output of the fast bin that are recycled back to the fast bin.

7. A system according to claim 5, further comprising a second multiplexer for arbitrating between a first input and a second input, and having an output coupled to the slow bin, the second multiplexer having the first input for receiving queue identifiers from the binning controller, and the second input for receiving queue identifiers from an output of the slow bin which recycles queue identifiers back into the slow bin.

8. The system of claim 7, wherein the second input receives queue identifiers from the output of the slow bin that are recycled back to the slow bin.

9. A system according to claim 7, further comprising a third multiplexer having a first input coupled to an output of the work bin, a second input coupled to an output of the fast bin, and an output coupled to the transmit DMA queue manager.

10. A system according to claim 9, wherein the transmit DMA queue manager receives queue identifiers from the work bin with a higher priority than queue identifiers from the fast bin.

11. A system according to claim 9, wherein the transmit DMA queue manager pulls packet descriptors from queues before retrieving the data packets.

12. A system according to claim 1, wherein the transmit rate parameter associated with each transmit queue indicates a minimum inter-packet-gap for data packets derived from the transmit queue.

13. A system according to claim 12, further comprising a pace table for storing the minimum inter-packet-gap and a bus interface unit coupled between the pace table and a processing unit for writing to and reading from the pace table.

14. A system according to claim 1, wherein one of the transmit queues comprises a kernel transmit queue.

15. A system according to claim 1, wherein one of the transmit queues comprises a user-level transmit queue.

16. A system according to claim 15, further comprising one or more transmit descriptors having virtual addresses of transmit buffers, the transmit buffers forming an address space of an application for transmitting data from the user-level transmit queue.

17. A method for controlling pacing over a network of a plurality of transmit queues in a host memory accessible to a network interface device via a communication bus, the method comprising:

assigning, for each active transmit queue, a queue identifier to one of a plurality of bins in dependence upon a packet transmit rate parameter associated with the identified transmit queue, each bin having a specified pacing threshold;

receiving at a transmit DMA queue manager one or more queue identifiers from the plurality of bins in accordance with the pacing thresholds of the respective bins; and in response to receiving those queue identifiers, retrieving data packets from the identified transmit queues for transmission over the network.

18. A method according to claim 17, wherein the packet transmit rate parameter is less than or equal to a first pacing threshold of a work bin, and the assigning step comprises transmitting the queue identifier to the work bin for immediate processing.

19. A method according to claim 17, wherein the packet transmit rate parameter is less than or equal to a second pacing threshold of a fast bin but greater than a first pacing threshold of a work bin, and the assigning step comprises transmitting the queue identifier to the fast bin.

20. A method according to claim 19, wherein the packet transmit rate parameter is less than or equal to a third pacing threshold of a slow bin but greater than the second pacing threshold of the fast bin, and the assigning step comprises transmitting the queue identifier to the slow bin.

21. A method according to claim 20, further comprising setting a time exit value associated with the queue identifier being placed in the fast or slow bin, wherein the time exit value is equal to a current time plus the pace value.

22. A method according to claim 17, wherein one of the transmit queues comprises a kernel transmit queue.

23. A method according to claim 17, wherein one of the transmit queues comprises a user-level transmit queue.

* * * * *

UNITED STATES PATENT AND TRADEMARK OFFICE
CERTIFICATE OF CORRECTION

PATENT NO. : 7,596,644 B2
APPLICATION NO. : 11/329444
DATED : September 29, 2009
INVENTOR(S) : Yu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 665 days.

Signed and Sealed this

Twenty-eighth Day of September, 2010

David J. Kappos
*Director of the United States Patent and Trademark Office*